United States Patent [19]
Edwards

[11] 3,897,442
[45] July 29, 1975

[54] THIAZOLE CARDIOVASCULAR AGENTS
[75] Inventor: John A. Edwards, Los Altos, Calif.
[73] Assignee: Syntex (U.S.A.) Inc., Palo Alto, Calif.
[22] Filed: Mar. 14, 1974
[21] Appl. No.: 451,195

[52] U.S. Cl....... 260/302 R; 260/294.8 D; 424/200; 424/264; 424/270
[51] Int. Cl............................................ C07d 91/32
[58] Field of Search ................................. 260/302 R

[56] References Cited
UNITED STATES PATENTS
3,328,417  6/1967  McLoughlin et al............ 260/302 R Primary Examiner—Richard J. Gallagher
Attorney, Agent, or Firm—Lawrence S. Squires; William B. Walker

[57] ABSTRACT

1-[β-(Aminocarbonylphenoxyl)-ethylamino]-3-(thiazol-2-oxy)-2-propanol and/or substituted amino derivatives thereof, and methods of making such compounds. The above compounds and their salts exhibit cardiovascular activity and are useful in the treatment of abnormal heart conditions in mammals. The compounds and derivatives can be prepared by treating 3-(thiazol-2-oxy)-1,2-epoxypropane with the desired substituted amine.

14 Claims, No Drawings

THIAZOLE CARDIOVASCULAR AGENTS

BACKGROUND OF THE INVENTION

1. Field of the Invention

This invention relates to 1-[β-(4-aminocarbonylphenoxy)-ethylamino]-3-(thiazol-2-

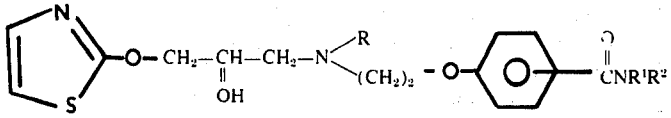

oxy)-2-propanol and derivatives thereof, and to methods of preparing such compounds. In a further aspect this invention relates to 1-[β-(4-alkylaminocarbonylphenoxy)-ethylamino]-3-(thiazol-2-oxy)-2-propanol and 1-[β-(4-dialkylaminocarbonylphenoxy)-ethylamino]-3-(thiazol-2-oxy)-2-propanol derivatives and to methods of preparing such compounds. This invention also relates to pharmaceutical compositions comprising one or more of the compounds, or pharmaceutically acceptable salts thereof, of the invention, and to methods of applying such compositions for the treatment of mammals.

2. The Prior Art

At the present time, the compound frequently used in the United States for the treatment of several cardiac arrhythmias in propranolol (i.e., 1-(isopropylamino)-3-(1-naphthyloxy)-2-propanol). This compound primarily achieves its therapeutic action by blocking cardiac β-adrenergic receptor sites and is a general β-adrenergic blocker which blocks the peripheral β-adrenergic receptor sites, such as those in the lung, as well as the β-adrenergic receptor sites in the heart. Propranolol is contraindicated in patients who suffer from asthma or chronic obstructive lung disease, because following its administration to such patients, an increase in airway resistance and bronchial constriction has been observed.

In my previous U.S. application Ser. No. 193,197, filed Oct. 27, 1971, and now abandoned I disclosed 1-isopropylamino-3-(thiazol-2-oxy)-2-propanol and related amino derivatives having strong beta adrenergic stimulating properties with weak β-blocking properties (also note Experientia, 28:1336–1337, November 15, 1972), I have now discovered a novel series of compounds having a 1-[β-(aminocarbonylphenoxy)-ethylamino] substituent in place of the 1-alkyl amino substituent of my previous compounds, and which are unexpectantly strong selective myocardial β-adrenergic blockers having only weak β-stimulant properties. Accordingly, I have now discovered potent cardiac selective β-adrenergic blocking agents which are effective for the treatment or palliation of angina pectoris and several cardiac arrythmias, and which further can safely be used by patients suffering from asthma or chronic obstructive lung disease.

SUMMARY OF THE INVENTION

In summary the compounds of the invention can be represented by the following generic formula:

wherein R is hydrogen or lower alkyl, $R^1$ and $R^2$ are independently selected from the group of hydrogen or alkyl having from one through ten carbon atoms.

Also encompassed within the invention are pharmaceutical acceptable salts of the above compounds.

In summary the process of the invention for preparing the compounds, of the invention, comprises treating 1,2-epoxy-3-(thiazol-2-oxy)-propane with a β-(aminocarbonyl-phenoxy)-ethylamine or substituted β-(aminocarbonylphenoxy)-ethylamine having the desired R, $R^1$ and $R^2$ substituents.

In summary the pharmaceutical compositions of the invention include both solutions and solids or powders comprising one or more of the compounds, of the invention in combination with a suitable pharmaceutical solution (e.g., sterile water) or pharmaceutical solid excipients.

The invention will be further described herein below.

DESCRIPTION OF THE INVENTION AND PREFERRED EMBODIMENTS

The compounds of the invention can be represented by the following formula:

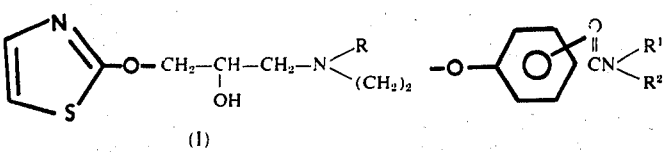

(I)

wherein R is selected from the group of hydrogen and lower alkyl, $R^1$ and $R^2$ are independently selected from the group of hydrogen and alkyl having from one through ten carbon atoms, and wherein the group

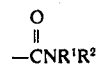

can be at any position on the phenyl group but preferably is at the para (4) position.

Also encompassed within the invention are pharmaceutically acceptable salts of the above compounds of formula I.

The compounds of the invention has an asymmetric carbon atom in the propane side chain and thus exist as optical isomers. Correspondingly the above formulas are intended to represent the respective individual (+) and (−) optical isomers as well as mixtures of such isomers and the individual isomers as well as mixtures thereof are encompassed within the invention. Where the compounds of the invention have 1-positioned substituents, on the propane chain, which have asymmetric atoms, the compounds exhibit further optical activity with respect to such asymmetric atoms.

DEFINITIONS

As used herein above and below, the following terms shall have the following meaning unless expressly stated to the contrary. The term alkyl, or alkylene, refers to both straight and branched chain alkyl groups. Where primed numerals are used with respect to alkyl groups, branched alkyl groups are meant with the primed numerals designating the position of lesser alkyl groups on the longer primary alkyl chain. Thus, for example, the term 5′-methylhexyl refers to the group

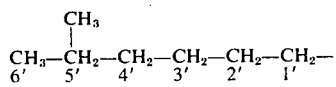

The term lower alkyl refers to both straight and branched chain alkyl groups having a total of from one through six carbon atoms and thus includes primary, secondary, and tertiary alkyl groups. Typical lower alkyls include, for example, methyl, ethyl, n-propyl, isopropyl, n-butyl, t-butyl, n-hexyl and the like. The term cycloalkyl refers to cyclic hydrocarbon groups having from three through 12 carbon atoms and preferably three through seven carbon atoms such as, for example, cyclopropyl, cyclopentyl, cycloheptyl and the like. The term alkenyl refers to monoethylenically unsaturated aliphatic groups and the term lower alkenyl refers to such groups having from two through six carbon atoms and wherein the double bond can be between any two adjacent carbon atoms. Typical lower alkenyl groups include, for example, vinyl, propenyl, and the like. The term alkoxy refers to groups having the formula R′O wherein R′ is alkyl and correspondingly the term lower alkoxy refers to the group having the formula R′O— wherein R′ is lower alkyl. Typical alkoxy groups include, for example, methoxy, ethoxy, t-butoxy and the like. The term halo refers to iodo, bromo, chloro and fluoro groups. The term acyl refers to acyl groups derived from carboxylic acids having from two through 12 carbon atoms such as acetyl, propionyl, butyryl, valeryl, isovaleryl, hexanoyl, heptanoyl, octanoyl, nonanoyl, undecanoyl, lauroyl, benzoyl, phenylacetyl, phenylpropionyl, o-, m-, p-toluoyl, β-cyclopentylpropionyl, formyl and the like.

The term alkoxycarbonyl refers to groups having the formula

wherein $R_3'$ is an alkyl group having from one through 11 carbon atoms. Typical alkoxycarbonyl groups thus include, for example, methoxycarbonyl, propoxycarbonyl, isopropoxycarbonyl, undecanoxycarbonyl and the like. The term acyloxy refers to groups derived from carboxylic acids having from two through 12 carbon atoms such as acetyloxy, propionyloxy, butyryloxy, valeryloxy, isovaleryloxy, hexanoyloxy, heptanoyloxy, octanoyloxy, nonanoyloxy, undecanoyloxy, lauroyloxy, benzoyloxy, phenylacetyloxy, phenylpropionyloxy, o-, m-, p-toluoyloxy, β-cyclopentylpropionyloxy and the like.

The term aryl refers to phenyl or substituted phenyls as defined herein below. By the term alkylaryl is meant an alkyl substituted phenyl group having one or more alkyl substituents and having up to 12 carbon atoms such as o-tolyl, m-tolyl, p-isopropylphenyl, 2,3-dimethylphenyl, 3,5-dimethylphenyl and the like. The term lower phenylalkyl refers to an alkyl group having from one through six carbon atoms and having a phenyl substituent. The term substituted lower phenylalkyl refers to an alkyl group having one through six carbon atoms and having a substituted phenyl (as defined herein) substituent. The term arylalkyl refers to the group of lower phenylalkyl and substituted lower phenylalkyl inclusive. The term substituted phenyl refers to phenyl groups which have one or two substituents independently selected from the group of hydroxy, lower alkyl, lower alkoxy or halo groups. Typical substituted phenyl groups include, for example, p-hydroxyphenyl, p-ethylphenyl, p-t-butoxyphenyl, p-fluorophenyl, p-chlorophenyl and the corresponding ortho and meta isomers, 3,4-dimethoxyphenyl, 3-bromo-4-chlorophenyl and the like.

The term alkylamino refers to the group having the formula R′HN wherein R′ is alkyl and the term lower alkylamino refers to such groups wherein R′ is lower alkyl. The term dialkylamino refers to the group having the formula $R_1'R_2'N$— wherein $R_1'$ and $R_2'$ are independently alkyl. Typical lower dialkylamino groups include, for example, dimethylamino, N-methyl-N-ethylamino, diethylamino, N-t-butyl-N-isopropylamino and the like.

The term aminocarbonyl or carbamoyl refers to the group having the formula

The term substituted aminocarbonyl (e.g. alkylaminocarbonyl) or substituted carbamoyl refers to the group having the formula

wherein $R^1$ is as defined herein. Typical alkylaminocarbonyl or alkylcarbamoyl groups include, for example, methylaminocarbonyl or methylcarbamoyl; heptylaminocarbonyl or heptylcarbamoyl; and the like. The term disubstituted aminocarbonyl or disubstituted carbamoyl refers to groups having the formula

wherein $R^1$ and $R^2$ are as defined herein. Typical dialkylaminocarbonyl or dialkylcarbamoyl groups include, for example, N-methyl-N-heptylaminocarbonyl or N-methyl-N-heptylcarbamoyl; diheptylaminocarbonyl or diheptylcarbamoyl.

Additional terminology definitions can be had by reference to my co-pending application U.S. Ser. No.

451,179, filed on even date herewith (Attorney File No. PA-647).

The term pharmaceutically acceptable salts refers to pharmaceutically acceptable hydrogen-anion addition salts which do not adversely affect the pharmaceutical properties of the parent compounds. With respect to the addition salts, suitable inorganic anions include, for example, chloride, bromide, iodide, sulfate, phosphate, carbonate, nitrate, hydrocarbonate, sulfate, and the like. Suitable organic anions include, for example, acetate, benzoate, lactate, picrate, propionate, butyrate, valerate, tartrate, maleate, fumarate, citrate, succinate, tosylate, ascorbate, pamoate, nicotinate, adipate, glyconate and the like.

Typical illustrations of the compounds of formula I can be had, for example, herein below by reference to Examples 4–8. The preferred R substituent is hydrogen. The preferred $R^1$ and $R^2$ substituents are those wherein one of $R^1$ or $R^2$ is hydrogen and preferably the other is selected from the group of hydrogen; or methyl; heptyl; 5'-methylhexyl or $R^1$ and $R^2$ are each methyl. The particularly preferred compound of formula I is:

1-[β-(4-aminocarbonylphenoxy)-ethylamino]-3-(thiazol-2-oxy)-2-propanol.

The preferred pharmaceutically acceptable salts are hydrogen addition salts of chloride, bromide, sulfate, maleate, lactate, tartrate, succinate and especially chloride. Thus, the preferred salts are the preferred anion addition salts of formula I and correspondingly the particularly preferred salts are the preferred hydrogen anion addition salts of the preferred and particularly preferred compounds of formula I and especially the maleate and hydrochloride salts.

The compounds of the invention can be prepared according to the following procedure, which can be conveniently represented by the following schematic overall reaction equation sequence:

wherein X is bromo or chloro, Y' is alkyl or phenyl, and $R^1$, $R^2$, and R have the same meanings as set forth herein above.

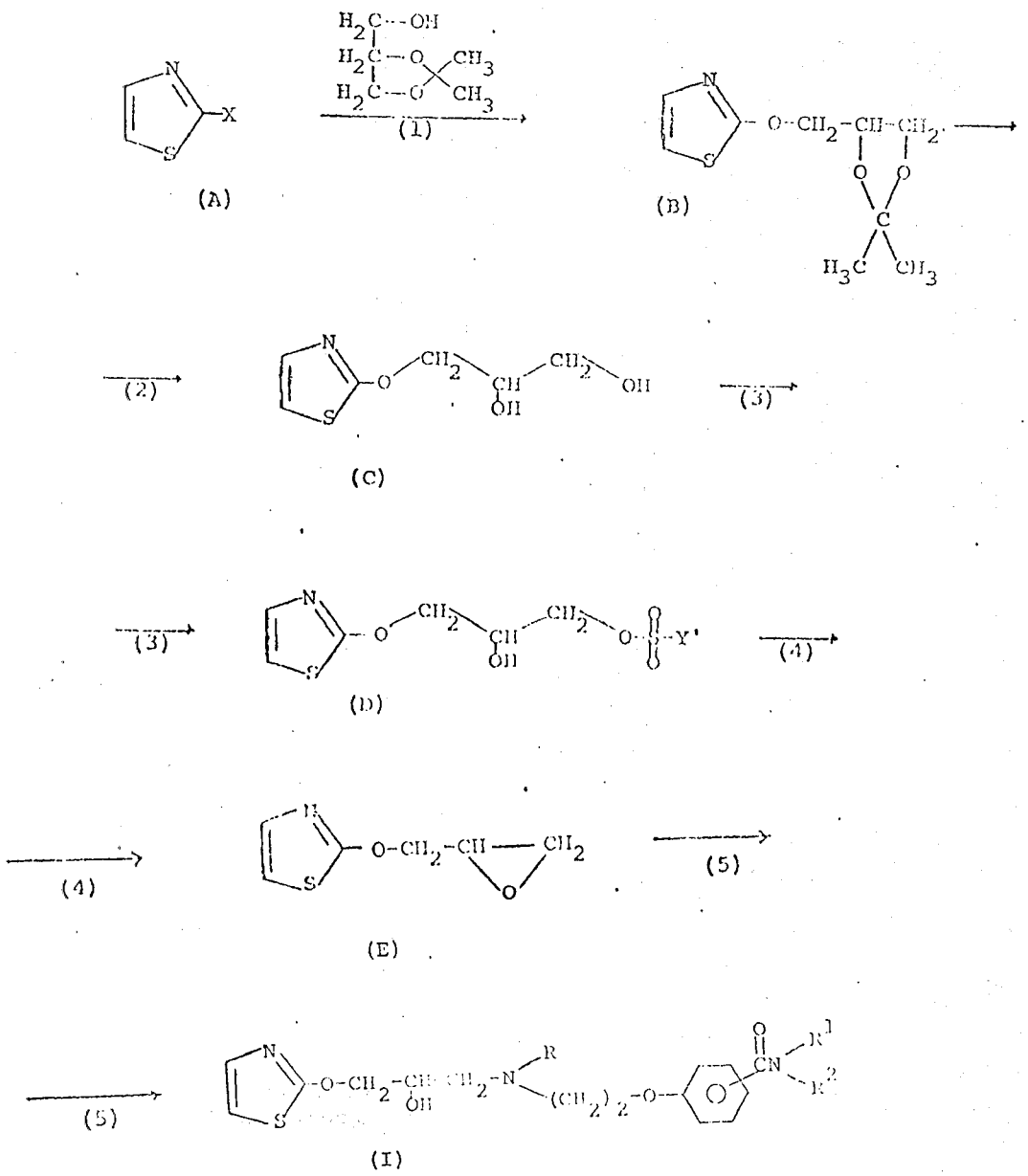

Step 1 of the above process can be effected by treating the thiazole compound of formula A with glycerol acetonide in a suitable inert solvent, in the presence of an alkali metal hydride. Typically, this treatment is conducted at temperatures in the range of about from 20°C to reflux for about from a few minutes to 20 hours, using mole ratios in the range of about from 1 to 100 moles of glycerol acetonide per mole of compound A. However, temperature, reaction times, and mole ratios both above and below can also be used. Suitable alkali metal hydrides which can be used include, for example, sodium hydride, potassium hydride, calcium hydride, lithium hydride and the like. Suitable inert organic solvents which can be used include, for example, monoglyme, tetrahydrofuran, diglyme, dimethylformamide, and the like. Also an excess of glycerol acetonide can be used as the solvent. Further by using the optically pure (+) glycerol acetonide isomer (see J. Biol. Chem. v. 128, p. 463 (1939)) or the optically pure (−) glycerol acetonide isomer (see J. Am. Chem. Soc. v. 67, p. 944 (1945)) the corresponding (+) or (−) optically active isomer of formula B is obtained. Correspondingly, wherein a (+) and (−) isomer mixture of the glycerol acetonide is used, the product will similarly be a mixture of isomers. This optically active isomer relationship between the starting materials and products exists throughout all the steps of various processes described herein. Also typically and conveniently, a racemic glycerol acetonide isomer mixture will be used and thus typically the product will correspondingly be a racemic mixture. The 2-chlorothiazole and 2-bromothiazole starting materials are known compounds and can be prepared according to known procedures (note, for example, K. Ganapathi and A. Venkataraman, Proc. Indian Acd. Sci., A22, 362 (145) describing 2-bromothiazole.

Step 2, can be conveniently effected by treating the compound of formula B with a suitable organic or inorganic acid, preferably in a suitable inert solvent. Typically this treatment is conducted at temperatures in the range of about from 0° to 65°C and preferably about 25°–30°C, for about from three minutes to 18 hours and preferably about from 1 to 4 hours. However, temperatures, reaction times and mole ratios both above and below these ranges can also be used. Suitable inorganic acids which can be used include, for example, hydrochloric acid, hydrobromic acid, sulfuric acid, phosphoric acid and the like. Suitable organic acids which can be used include, for example, formic acid, oxalic acid, acetic acid, propionic acid, and the like. Suitable solvents which can be used include, for example, water, methanol, acetone, monoglyme, ether and the like. Good results are typically obtained by using aqueous formic acid solution.

Step 3 of the above process can be effected by treating the compound of formula C with a suitable phenyl sulfonyl chloride or bromide or alkyl sulfonyl chloride or bromide, in a suitable inert organic solvent in the presence of a base. The particular sulfonyl derivative used is largely immaterial since the sulfonyl substituent is split off during the next step. Thus, typically other phenyl sulfonyl chloride or bromide or alkyl sulfonyl chloride or bromide derivatives can also be used. Typically this treatment is conducted at temperatures in the range of about from 0° to 60°C and preferably about from 0° to 25°C for about from 5 minutes to 18 hours, preferably about from 10 minutes to 45 minutes, using mole ratios in the range of about from 1.0 to 1.1 moles of sulfonyl derivative per mole of compound of formula C. However, temperatures, treatment times, and mole ratios both above and below these ranges can also be used. Suitable phenyl sulfonyl chlorides or bromides, which can be used include, for example, benzene sulfonyl chloride, benzene sulfonyl bromide, or p-toluene sulfonyl chloride, p-ethyl benzene sulfonyl bromide, and the like. Suitable alkyl sulfonyl chlorides, and bromides, which can be used include, for example, methane sulfonyl chloride, methane sulfonyl bromide and the like. Suitable bases which can be used include, for example, pyridine, triethylamine or other tertiary amines and the like. Suitable solvents include methyl dichloride, diethyl ether, tetrahydrofuran and the like. Pyridine can be conveniently used as both the base and the solvent.

Step 4 can be conveniently effected by treating the compound of formula D with a strong base preferably in an inert organic solvent. Conveniently this treatment is conducted by adding a strong base directly to the product reaction mixture of step 3 without separation of the product of formula D from the reaction mixture. The treatment can, of course, also be applied to the isolated product of formula D. Typically, this treatment is conducted at temperatures in the range of about from 0° to 100°C, preferably about from 20° to 60°C for from ½ hour to 3 hours. Suitable strong bases which can be used include, for example, alkali metal hydroxides such as, for example, sodium hydroxide, potassium hydroxide, and the like, and alkali metal alkoxides such as, for example, sodium methoxide, potassium methoxide, and alkyl or aryl lithiums such as butyl lithium, octyl lithium, phenyl lithium and the like. Suitable inert organic solvents include, for example, monoglyme, ethyl ether, benzene, methanol and the like.

Step 5 can be conducted by treating the compound of formula E with the desired $\beta$-(2-, 3-, or 4-aminocarbonylphenoxy)-ethylamine or the desired R and/or $R^1$ and/or $R^2$ substituted derivative thereof, in an inert organic solvent. This treatment is typically conducted at temperatures in the range of about from 15° to 100°C for about from 10 minutes to 18 hours. However, temperature ranges both above and below these can also be used. Suitable solvents which can be used include, for example, monoglyme, methanol, ethanol, pyridine and the like. Suitable amines which can be used include, for example, $\beta$-(4-aminocarbonylphenoxy)-ethylamine; N-methyl-$\beta$-(4-aminocarbonylphenoxy)-ethylamine; $\beta$-(4-methylaminocarbonylphenoxy)-ethylamine, $\beta$-(4-5'-methylhexylaminocarbonylphenoxy)-ethylamine, N-methyl-$\beta$-(4-5'-methylhexylaminocarbonylphenoxy)-ethylamine, N-methyl-$\beta$-[4-(N'-methyl-5'-methylhexylaminocarbonyl)-phenoxy]-ethylamine and the corresponding 2- and 3-position substituted phenoxy isomers, and the like. The amines can be conveniently prepared according to the procedures described in J. Med. Chem., v. 16, No. 11, 1245 (1973) and in the preparation set forth hereinbelow, or by obvious modifications thereof, well within scope of those skilled in the art (e.g., substitution of appropriate reagents).

Preferably, with the exception of step 4 which, as noted above, is conveniently conducted by addition to the previous product reaction mixture, the respective products of each step are isolated prior to their subsequent use as starting materials for the next succeeding step. Separation and isolation can be effected by any suitable separation or purification procedure such as, for example, evaporation, crystallization, chromatography, thin-layer chromatography, etc. Specific illustrations of typical separation and isolation procedures can be had by reference to the corresponding examples described herein below. However, other equivalent separation or isolation procedures could, of course, also be used. Where an isomer mixture of the product of formula I is obtained, for example, where racemic glycerol acetonide mixture has been used in step 1, the respective optically active (+) and (−) isomers can be resolved by conventional procedures. Such as, for example, by reacting the compounds of formula I with an optically active acid which will yield a mixture of optical salts of the compounds of formula I which can be separated by conventional procedures (e.g., repeated crystallization) into the respective (+) and (−) optical salts which can then be cleaved to the free compounds.

The pharmaceutically acceptable acid addition salts of the compounds of formula I of the invention can be prepared via neutralization of the parent compound, typically via neutralization of an amino moiety, with the desired acid. Other pharmaceutically acceptable addition salts can then be conveniently prepared from the neutralization addition salts via anion exchange with a suitable ion exchange resin in the desired anion form.

The compounds of the invention are useful in the treatment and palliation of cardiovascular abnormalities in mammals. These compounds primarily achieve their therapeutic action by selectively blocking the cardiac $\beta$-adrenergic receptor sites and accordingly because they are cardiac selective, they can also be applied to treat cardiac abnormalities in patients suffering from asthma or chronic obstructive lung disease. For example, based on animal heart studies (i.e., dog) 1-[$\beta$-(4-aminocarbonylphenoxy)-ethylamino]-3-(thiazol-2-oxy)-2-propanol is approximately two times as active as practolol in inhibiting the contractile force response to isoproterenol and four times as active at inhibiting the heart rate response to isoproterenol. In addition this compound appears to produce no cardiac depression and to be about three times as selective as practolol in its ability to inhibit isoproterenol induced stimulation of myocardial adenylcydase versus isoproterenol induced stimulation of lung adenylcydase. Hence, based on these tests, this compound is both more active and more selective than propranolol. The compounds are especially useful in the treatment or palliation of cardiac arryhthmias, angina pectoris, hypertrophic subaortic stenosis, pheochromocytoma, thyrotoxicosis, hyperkinetic syndromes, tetralogy of Fallot, mitral stenosis with tachycardia, general ischemic conditions, and hypertension founded on elevated cardiac outputs due to a hyperadrenergic state. The compounds are active, both in the treatment or palliation of acute attacks of such cardiac disorders, and further can be applied prophylactically to prevent or reduce the frequency of such attacks. This prophylactic action is particularly desirable in reducing the frequency of attacks of angina pectoris, since the medication (i.e., nitroglycerin) presently commonly used in the treatment of angina pectoris has no recognized prophylactic action.

Additional information concerning the use, action and determination of $\beta$-blockers can be obtained by reference to the literature such as, for example, Dotlery et al, Clinical Pharmacology and Therapeutics, volume 10, No. 6, 765–797 and the references cited therein.

The compounds of the invention can be administered in a wide variety of dosage forms, either alone or in combination with other pharmaceutically compatible medicaments, in the form of pharmaceutical compositions suited for oral or parenteral administration. The compounds are typically administered as pharmaceutical compositions consisting essentially of the pharmaceutically acceptable salts of the compounds of formula I and a pharmaceutical carrier. The pharmaceutical carrier can be either a solid material or liquid, in which the compound is dissolved, dispersed or suspended, and can optionally contain small amounts of preservatives and/or pH-buffering agents. Suitable preservatives which can be used include, for example, benzyl alcohol and the like. Suitable buffering agents include, for example, sodium acetate and pharmaceutical phosphate salts and the like.

The liquid compositions can, for example, be in the form of solutions, emulsions, suspensions, syrups or elixirs and optionally can contain small quantities of preservatives and/or buffering agents.

The solid compositions can take the form of tablets, powders, capsules, pills or the like, preferably in unit dosage forms for simple administration or precise dosages. Suitable solid carriers include, for example, pharmaceutical grades of starch, lactose, sodium saccharin, sodium bisulfite and the like.

The compounds of this invention are typically administered in dosages of about from 0.01 to 5 mg. per kg. of body weight. The precise effective dosage will, of course, vary depending upon the mode of administration, the condition being treated and the host. Preferably, the compounds are administered orally, either as solid compositions, e.g., tablets, or liquids as described herein above.

A further understanding of the invention can be had from the following non-limiting Preparations and Examples. Also as used herein above and below unless expressly stated to the contrary, all temperatures and temperature ranges refer to the Centigrade system and the terms ambient or room temperature refer to about 20°C. The term percent or (%) refers to weight percent. The term equivalent refers to a quantity of reagent equal in moles to the moles of the preceding or succeeding reactant recited in that Example in terms of moles or finite weight or volume. Also unless expressly stated to the contrary, racemic mixtures are used as starting materials and correspondingly racemic mixtures are obtained as products and where necessary, preparations and examples are repeated to provide sufficient quantities of starting materials for subsequent preparations and examples.

PREPARATION 1

A mixture containing 100 g. of p-hydroxymethylbenzoate, 200 g. of anhydrous potassium carbonate, and 400 g. of 1,2-dibromoethane in 1500 ml. of methylethyl ketone is refluxed for 12 hours and then filtered and concentrated by evaporation. The concentrate is then dissolved in ethyl acetate, washed with water, dried over magnesium sulfate, and evaporated to an oily solid, which is then further evaporated under vacuum to remove excess dibromoethane, yielding a residue of 1-bromo-2-(4-methoxycarbonylphenoxy)-ethane.

PREPARATION 2

In this preparation a mixture containing 130 g. of 1-bromo-2-(4-methoxycarbonylphenoxy)-ethane, 80 g. of sodium azide in 1400 ml. of methanol and 300 ml. of water is stirred for 12 hours at about 0°C. The methanol solvent is then removed by evaporation and the resulting concentrate poured into 2 l. of ethyl acetate, washed twice with water, dried over magnesium sulfate, and evaporated to a low volume concentrate. 1.5 Liters of absolute ethanol is then added and the resulting mixture reduced to a volume of 750 ml. by evaporation. The resulting 1-azido-2-(4-methoxycarbonylphenoxy)-ethane rich concentrate is retained as a concentrate for use in subsequent preparations.

PREPARATION 3

The 1-azido-2-(4-methoxycarbonylphenoxy)-ethane concentrate, prepared in Preparation 2, is stirred vigorously with 2 g. of a 5% palladium on charcoal catalyst, and then hydrogen is slowly bubbled through the mixture at about room temperature for 24 hours. The catalyst is then removed by filtration and the solvent removed by evaporation affording 2-(4-methoxycarbonylphenoxy)-ethylamine, as an oil.

PREPARATION 4

In this preparation a mixture containing 0.05 moles of 2-(4-methoxycarbonylphenoxy)-ethylamine, 0.065 moles of formaldehyde, 1 g. of finely divided palladium oxide catalyst in 100 ml. of ethanol is stirred vigorously under hydrogen for 24 hours at room temperature. The catalyst is then removed by filtration and the ethanol solvent removed by evaporation affording a crude residue of N-methyl-2-(4-methoxycarbonylphenoxy)-ethylamine. The crude residue is then further purified by treatment with dilute aqueous hydrochloric acid to yield the corresponding hydrochloride salt which is purified by crystallization and then converted back to the free base by treatment with dilute sodium hydroxide.

Similarly, by following the same procedure but replacing formaldehyde with propionaldehyde, t-butyraldehyde, and n-hexaldehyde, the following compounds are respectively prepared:

N-propyl-2-(4-methoxycarbonylphenoxy)-ethylamine;

N-t-butyl-2-(4-methoxycarbonylphenoxy)-ethylamine; and

N-hexyl-2-(4-methoxycarbonylphenoxy)-ethylamine.

PREPARATION 5

In this preparation 100 g. of 2-(4-methoxycarbonylphenoxy)-ethylamine is stirred with 500 ml. of concentrated ammonium hydroxide for 24 hours at room temperature affording a precipitate of 2-(4-aminocarbonylphenoxy)-ethylamine which is recovered by filtration and further purified by recrystallization from ethanol.

Similarly, by following the same procedure but using the corresponding primary or secondary amine in place of ammonium hydroxide, and using ethanol as a solvent, where necessary, the following compounds are respectively prepared:

β-(4-methylaminocarbonylphenoxy)-ethylamine;
β-(4-t-butylaminocarbonylphenoxy)-ethylamine;
β-(4-isopropylaminocarbonylphenoxy)-ethylamine;
β-(4-5'-methylhexylaminocarbonylphenoxy)-ethylamine;
β-(4-4'-methylhexylaminocarbonylphenoxy)-ethylamine;
β-(4-heptylaminocarbonylphenoxy)-ethylamine;
β-(4-dimethylaminocarbonylphenoxy)-ethylamine;
β-(4-N'-methyl-5'-methylhexylaminocarbonylphenoxy)-ethylamine;
β-(4-dihexylaminocarbonylphenoxy)-ethylamine; and
β-(4-didecylaminocarbonylphenoxy)-ethylamine.

Similarly, by following the same procedure but replacing 2-(4-aminocarbonylphenoxy)-ethylamine with N-methyl-2-(4-methoxycarbonylphenoxy)-ethylamine; N-propyl-2-(4-methoxycarbonylphenoxy)-ethylamine; N-t-butyl-2-(4-methoxycarbonylphenoxy)-ethylamine and N-hexyl-2-(4-methoxycarbonylphenoxy)-ethylamine, the corresponding methyl, propyl, t-butyl, and n-hexyl, secondary amine derivatives of each of the above compounds is respectively prepared.

PREPARATION 6

2-(3-Aminocarbonylphenoxy)-ethylamine.

In this preparation the procedures of Preparations 1–5 are repeated but replacing in Preparation 1 p-hydroxymethylbenzoate with 3-hydroxymethylbenzoate, respectively yielding the corresponding 3-substituted phenoxy isomers of each of the products prepared in Preparations 1–5.

PREPARATION 7

2-(2-Aminocarbonylphenoxy)-ethylamine.

In this preparation the procedures of Preparations 1–5 are repeated but replacing in Preparation 1 p-hydroxymethylbenzoate with 2-hydroxymethylbenzoate, respectively yielding the corresponding 2-substituted phenoxy isomers of each of the products prepared in Preparations 1–5.

EXAMPLE 1

This example illustrates the first step in the preparation of the compounds of the invention. In this example sodium hydride (18 g., 56 wt.% dispersion in oil) is washed with n-hexane, and the hexane is replaced with monoglyme (100 ml.). To this mixture is added a solution of glycerol acetonide (44.5 g) in monoglyme (200 ml.) under an atmosphere of nitrogen. After 15 minutes, 2-chlorothiazole (32 g.) is added, and the mixture is refluxed for 1.25 hours. The reaction mixture is then cooled, diluted with ether and filtered. The filtrate is washed with saturated aqueous sodium chloride solution twice, dried and concentrated by evaporation. Fractional distillation yields 3-(thiazol-2-oxy)-propanediol 1,2-acetonide.

Repeating the above procedure with 2-bromothiazole yields 3-(thiazol-2-oxy)-propanediol 1,2-acetonide.

EXAMPLE 2

In this example one gram of 3-(thiazol-2-oxy)-propanediol 1,2-acetonide in 2 ml. of a 88% aqueous formic acid is stirred at room temperature for 5 minutes. The solution is then evaporated under vacuum at room temperature to yield a residue of 3-(thiazol-2-oxy)-1,2-propanediol.

EXAMPLE 3

In this example 50 grams of 2-(thiazol-2-oxy)-1,2-propanediol is dissolved in 200 ml. of pyridine at 20°C and then 22.5 ml. of methylsulfonyl chloride is added. The mixture is allowed to stand for 10 minutes and then separated into two portions (1/10 portion and one 9/10 portion). The 1/10 portion is diluted with water, then filtered and the resulting filter cake dried affording 2-hydroxy-1-methylsulfonyloxy-3-(thiazol-2-oxy)-propane.

The remaining 9/10 portion is diluted with one liter of ethyl ether and 200 g. of solid sodium methoxide added in portions during 5-10 minutes. The resulting mixture is stirred at 20°-25°C for 1 hour, or until complete transformation is demonstrated by thin-layer chromatography, and then poured into water. The ether layer is washed several times with water and then concentrated. The concentrate is diluted with benzene and washed with 20 vol. % aqueous acetic acid three times, then with saturated aqueous sodium chloride solution three times, and then once with an aqueous saturated sodium bicarbonate solution. The organic layer is dried over sodium sulfate and evaporated to remove all residual solvent. The residue is distilled at reduced pressure to yield 1,2-epoxy-3-(thiazol-2-oxy)-propane.

EXAMPLE 4

This example illustrates the method according to the invention of preparing the compounds of formula I of the invention. In this example 1 g. of β-(4-aminocarbonylphenoxy)-ethylamine is added to a solution containing 0.4 g. of 1,2-epoxy-3-(thiazol-2-oxy)-propane in 20 ml. of anhydrous absolute ethanol at 20°C. The resulting mixture is monitored by thin-layer chromatographic analysis and allowed to stand until conversion of the 1,2-epoxy-3-(thiazol-2-oxy)-propane is essentially complete. The mixture is then evaporated to dryness yielding a crude residue which is then further purified by thin-layer chromatography on silica gel yielding 1-[β-(4-aminocarbonylphenoxy)-ethylamino]-3-(thiazol-2-oxy)-2-propanol.

Similarly, by following the same procedure but using the correspondingly substituted amines as starting materials, the following products are respectively prepared:

1-[β-(4-methylaminocarbonylphenoxy)-ethylamino]-3-(thiazol-2-oxy)-2-propanol;

1-[β-(4-t-butylaminocarbonylphenoxy)-ethylamino]-3-(thiazol-2-oxy)-2-propanol;

1-[β-(4-isopropylaminocarbonylphenoxy)-ethylamino]-3-(thiazol-2-oxy)-2-propanol;

1-[β-(4-5'methylhexylaminocarbonylphenoxy)-ethylamino]-3-(thiazol-2-oxy)-2-propanol;

1-[β-(4-4'-methylhexylaminocarbonylphenoxy)-ethylamino]-3-(thiazol-2-oxy)-2-propanol;

1-[β-(4-hexylaminocarbonylphenoxy)-ethylamino]-3-(thiazol-2-oxy)-2-propanol;

1-[β-(4-dimethylaminocarbonylphenoxy)-ethylamino]-3-(thiazol-2-oxy)-2-propanol;

1-[β-(4-N'-methyl-5'-methylhexylaminocarbonylphenoxy)-ethylamino]-3-(thiazol-2-oxy)-2-2-propanol;

1-[β-(4-dihexylaminocarbonylphenoxy)-ethylamino]-3-(thiazol-2-oxy)-2-propanol;

1-[β-(4-didecylaminocarbonylphenoxy)-ethylamino]-3-(thiazol-2-oxy)-2-propanol;

Similarly, by following the same procedure but using each of the N-methyl, N-propyl, N-t-butyl and N-hexyl secondary amines prepared in Preparation 5 as the amine reagents, the corresponding N-methyl; N-propyl; N-t-butyl and N-hexylamino derivatives of each of the above products are respectively prepared.

Similarly, by following the same procedure but respectively using each of the amines prepared in Preparations 6 and 7, the corresponding 3-position and 2-position substituted phenoxy isomers of each of the above products are respectively prepared.

EXAMPLE 5

This example illustrates methods of preparing hydrochloride addition salts of the invention. In this example 1 g. of 1-[β-(4-aminocarbonylphenoxy)-ethylamino]-(thiazol-2-oxy)-2-propanol is dissolved in 10 ml. of ethyl ether at 20°C. A stream of gaseous anhydrous hydrogen chloride is passed over the surface of the solution until the supernatent liquid becomes colorless. The resulting precipitate is collected by filtration, washed with ethyl ether and then crystallized from methanol, containing 1% water and 1% acetone, affording crystalline 1-[β-(4-aminocarbonylphenoxyl)-ethylamino]-3-(thiazol-2-oxy)-2-propanol hydrochloride.

Similarly, by following the same procedure using each of the compounds of formula I, prepared according to Example 4 as starting materials, the corresponding hydrochloride addition salts of each of these compounds is respectively prepared.

EXAMPLE 6

This example illustrates methods of preparing the maleate addition salts of the invention. In this example one gram of 1-[β-(4-aminocarbonylphenoxyethylamino]-(thiazol-2-oxy)-2-propanol is dissolved in a solution of 5 ml. of ethy ether and 5 ml. of ethanol at 20°C. To this solution is added 10 ml. of a saturated solution of maleic acid in ethyl ether. The mixture is allowed to stand for one hour at room temperature. The resulting precipitate is recovered by filtration, washed three times with ethyl ether and then crystallized from a mixture of ethyl ether and ethanol (1:1) affording crystalline 1-[β-(4-aminocarbonylphenoxy)-ethylamino]-3-(thiazol-2-oxy)-2-propanol maleate salt.

Similarly, by following the same procedure using each of the products prepared according to Example 4 as starting materials, the corresponding maleate addition salts are respectively prepared.

EXAMPLE 7

This example illustrates the preparation, according to the invention, of the pure (+) optical isomers of the compounds of the invention. In this example, the procedures of Examples 1-6 are repeated but in this instance, in place of racemic glycerol acetonide, the pure (+) optical isomer of glycerol acetonide is used as starting material in Example 1 is used in place of racemic glycerol.

EXAMPLE 8

This example illustrates the preparation, according to the invention, of the pure (−) optical isomers of the compounds of the invention. In this example, the procedures of Examples 1-6 are repeated but in this instance, in place of racemic glycerol acetonide, the pure

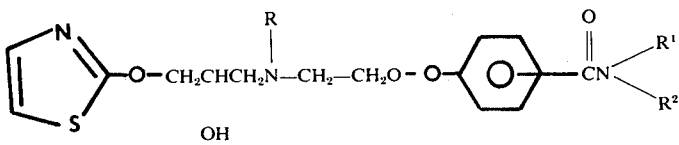

(—) optical isomer of glycerol acetonide is used as starting material in Example 1.

Obviously many modifications and variations of the invention, described herein above and below in the claims, can be made without departing from the essence and scope thereof.

What is claimed is:

1. A compound selected from the group having the formula:

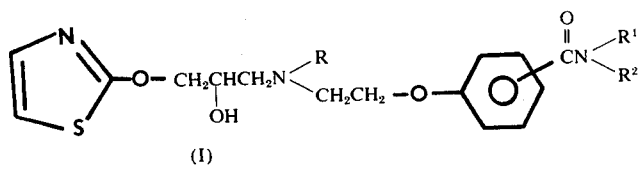

(I)

wherein R is hydrogen or lower alkyl having from one through six carbon atoms; $R^1$ and $R^2$ are independently selected from the group of hydrogen or alkyl having from one through ten carbon atoms; and the group

—$CNR^1R^2$ can be at any position on the phenyl ring; and pharmaceutically acceptable salts thereof.

2. The compound of claim 1 wherein R is hydrogen.
3. The compound of claim 1 wherein at least one of $R^1$ or $R^2$ is hydrogen.
4. The compound of claim 3 wherein R is hydrogen.
5. The compound of claim 4 wherein one of $R^1$ or $R^2$ is hydrogen and the other is selected from the group of hydrogen, methyl, heptyl, and 5'-methylhexyl.
6. The compound of claim 1 having the formula:

wherein R, $R^1$ and $R^2$ are as defined in claim 1; and pharmaceutically acceptable salts thereof.

7. The compound of claim 6 wherein R is hydrogen.
8. The compound of claim 6 wherein one of $R^1$ or $R^2$ is hydrogen.
9. The compound of claim 6 wherein one of $R^1$ or $R^2$ is hydrogen and the other is selected from the group of hydrogen, methyl, heptyl, and 5'-methylhexyl.
10. The compound of claim 9 wherein R is hydrogen.
11. The compound of claim 10 wherein $R^1$ and $R^2$ are each hydrogen.
12. The compound of claim 1 wherein said pharmaceutically acceptable salt is selected from the group of hydrochloride and maleate addition salts.
13. The compound of claim 6 wherein said pharmaceutically acceptable salt is selected from the group of hydrochloride and maleate addition salts.
14. The compound of claim 11 wherein said pharmaceutically acceptable salt is selected from the group of hydrochloride and maleate addition salts.

* * * * *